(12) United States Patent
Oh et al.

(10) Patent No.: US 12,400,176 B2
(45) Date of Patent: Aug. 26, 2025

(54) DELIVERY MANAGEMENT SERVER, UNMANNED DELIVERY ROBOT, UNMANNED CARGO AIRCRAFT FOR DELIVERING GOODS REFLECTING NAVIGATION ROUTE INFORMATION OF A VEHICLE

(71) Applicants: HYUNDAI MOTOR COMPANY, Seoul (KR); KIA CORPORATION, Seoul (KR)

(72) Inventors: Jong Min Oh, Hwaseong-si (KR); Ji A Lee, Seoul (KR); Ji Min Han, Anyang-si (KR); Ki Seok Sung, Seongnam-si (KR); Jong Kyu Choi, Yongin-si (KR); Young Jun Byun, Seoul (KR); Kye Yoon Kim, Gunpo-si (KR); Jae Hoon Chung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 310 days.

(21) Appl. No.: 17/832,859

(22) Filed: Jun. 6, 2022

(65) Prior Publication Data
US 2023/0222436 A1 Jul. 13, 2023

(30) Foreign Application Priority Data
Jan. 10, 2022 (KR) .................. 10-2022-0003240

(51) Int. Cl.
*G06Q 10/0835* (2023.01)
*B64U 10/13* (2023.01)
(Continued)

(52) U.S. Cl.
CPC ....... *G06Q 10/08355* (2013.01); *B64U 10/13* (2023.01); *G01C 21/3476* (2013.01);
(Continued)

(58) Field of Classification Search
CPC .......... G06Q 10/08355; G06Q 10/087; G06Q 10/047; G06Q 10/0637; G06Q 10/0834;
(Continued)

(56) References Cited

U.S. PATENT DOCUMENTS 9,786,165 B2 * 10/2017 Sham .................... G08G 1/012
9,792,576 B1 * 10/2017 Jamjoom ................ G06F 16/00
(Continued)

FOREIGN PATENT DOCUMENTS

JP 2018-513456 A 5/2018
KR 10-2019-0126756 A 11/2019
(Continued)

*Primary Examiner* — Abdalla A Khaled
(74) *Attorney, Agent, or Firm* — Morgan, Lewis & Bockius LLP

(57) ABSTRACT

A delivery management server includes: a control module for searching for a plurality of delivery locations located on a navigation route among the navigation information and transmitting the searched delivery locations, when order information and navigation information of goods are received; and a determination module for determining an assembly point to receive goods loaded in an unmanned cargo aircraft according to the order information and an unmanned delivery robot to receive the goods from the assembly point and deliver them to the delivery location to receive the goods from the assembly point and deliver the same to the delivery location, so that the goods can be delivered to the delivery location within the estimated arrival time, when the delivery location selected by the user among the plurality of delivery locations and the estimated arrival time of the vehicle to the selected delivery location are received.

16 Claims, 6 Drawing Sheets

(51) Int. Cl.
  *G01C 21/34*  (2006.01)
  *G05D 1/00*  (2024.01)
  *B64U 101/20*  (2023.01)
  *B64U 101/60*  (2023.01)

(52) U.S. Cl.
  CPC ........... *G05D 1/0212* (2013.01); *G05D 1/101* (2013.01); *B64U 2101/20* (2023.01); *B64U 2101/60* (2023.01)

(58) Field of Classification Search
  CPC .............. G06Q 10/0836; B64C 39/024; G01C 21/3476; G01C 21/3423; G01C 21/3438; G01C 21/3469; G05D 1/0212; G05D 1/101; G05D 1/0217; G05D 1/0297; B64U 2101/20; B64U 2101/60; B64U 50/19; B64U 2201/20; B25J 9/1664; B25J 11/008
  See application file for complete search history.

(56) References Cited

U.S. PATENT DOCUMENTS

| | | | | |
|---|---|---|---|---|
| 11,392,130 | B1* | 7/2022 | Desrosiers | G01C 21/20 |
| 11,748,688 | B2* | 9/2023 | Ur | B64C 39/024 |
| | | | | 705/332 |
| 11,879,745 | B2* | 1/2024 | Dudar | B25J 11/008 |
| 12,205,072 | B1* | 1/2025 | Mohammed | G06Q 10/083 |
| 2015/0370251 | A1* | 12/2015 | Siegel | B64D 1/22 |
| | | | | 701/2 |
| 2016/0196756 | A1* | 7/2016 | Prakash | B64U 70/95 |
| | | | | 701/3 |
| 2017/0358222 | A1* | 12/2017 | Schubert | G08G 1/0129 |
| 2018/0107209 | A1* | 4/2018 | Hardee | G08G 1/20 |
| 2018/0224867 | A1 | 8/2018 | Yu et al. | |
| 2019/0012636 | A1 | 1/2019 | Simon et al. | |
| 2019/0043370 | A1* | 2/2019 | Mulhall | G08G 5/26 |
| 2019/0108472 | A1* | 4/2019 | Sweeney | G06Q 10/083 |
| 2019/0206264 | A1* | 7/2019 | Todasco | G08G 5/55 |
| 2019/0322367 | A1* | 10/2019 | El Idrissi | G08G 1/096822 |
| 2020/0019925 | A1* | 1/2020 | Tokhtabaev | H04W 4/44 |
| 2020/0126413 | A1* | 4/2020 | Sham | G08G 1/165 |
| 2020/0191581 | A1* | 6/2020 | Chun | G06Q 10/047 |
| 2020/0286033 | A1* | 9/2020 | Ur | G01C 21/3423 |
| 2020/0302382 | A1* | 9/2020 | Gu | B64F 1/32 |
| 2020/0356114 | A1* | 11/2020 | Uçar | G06Q 10/0631 |
| 2021/0065108 | A1 | 3/2021 | Gabbai | |
| 2021/0073715 | A1 | 3/2021 | Yamada et al. | |
| 2021/0132625 | A1* | 5/2021 | Gillett | B64U 60/60 |
| 2021/0208603 | A1 | 7/2021 | Tazume et al. | |
| 2022/0283313 | A1* | 9/2022 | Lekutai | G08G 5/26 |
| 2024/0027210 | A1* | 1/2024 | Hotta | G01C 21/3461 |

FOREIGN PATENT DOCUMENTS

| | | |
|---|---|---|
| KR | 10-2095735 B1 | 4/2020 |
| KR | 10-2020-0097482 A | 8/2020 |
| KR | 10-2190968 B1 | 12/2020 |
| KR | 10-2206749 B1 | 1/2021 |
| KR | 10-2282360 B1 | 7/2021 |
| KR | 10-2288037 B1 | 8/2021 |
| KR | 10-2304951 B1 | 9/2021 |
| WO | 2016-140988 A1 | 9/2016 |

* cited by examiner

DELIVERY MANAGEMENT SERVER, UNMANNED DELIVERY ROBOT, UNMANNED CARGO AIRCRAFT FOR DELIVERING GOODS REFLECTING NAVIGATION ROUTE INFORMATION OF A VEHICLE

CROSS-REFERENCE TO RELATED APPLICATION(S)

This application claims benefit of priority to Korean Patent Application No. 10-2022-0003240 filed on Jan. 10, 2022 in the Korean Intellectual Property Office, the disclosure of which is incorporated herein by reference in its entirety.

TECHNICAL FIELD

The present disclosure relates to a delivery management server, an unmanned delivery robot, and an unmanned cargo aircraft for delivering goods by following navigation route information of a vehicle.

BACKGROUND

Recently, online shopping has been offered, and as a result, when a customer purchases an item online, the purchased item can be delivered to a desired location, but there is no existing technology for receiving goods delivered in connection with a vehicle navigation route.

On the other hand, recently, research and development of an unmanned cargo aircraft system or an unmanned delivery robot for transporting a large amount of cargo by autonomous driving is in progress. Accordingly, if such vehicles can be linked with a vehicle's navigation route, the user can receive a high-quality service that enables the user to receive goods from the desired delivery location without changing the navigation route to the destination.

However, if there are a plurality of assembly points where an unmanned cargo aircraft can be landed within a delivery area having a preset radius centered on the delivery location, and there are also a plurality of unmanned delivery robots for delivering goods to the delivery location, there is still no solution to which assembly point and which unmanned delivery robot should be selected.

SUMMARY

An aspect of the present disclosure is to provide a delivery management server, an unmanned delivery robot, and an unmanned cargo aircraft for delivering goods by following a vehicle navigation route capable of receiving goods from a desired delivery location without changing the navigation route to a destination, thereby improving customer satisfaction, and purchasing convenience.

An aspect of the present disclosure is to provide a delivery management server, an unmanned delivery robot, and an unmanned cargo aircraft for delivering goods by determining an assembly point and an unmanned delivery robot with an optimal combination when there are a plurality of assembly points and a plurality of unmanned delivery robots within a delivery area having a preset radius centered on the delivery location.

According to an embodiment of the present disclosure, a delivery management server for delivering goods reflecting navigation route information of a vehicle is provided. The delivery management server includes: a control module for searching for a plurality of delivery locations located on a navigation route among the navigation information and transmitting the searched delivery locations, when order information and navigation information of goods are received; and a determination module, when a delivery location selected by a user among the plurality of delivery locations and an estimated time of arrival of a vehicle to the selected delivery location are received, for determining an assembly point that will receive goods loaded in an unmanned cargo aircraft according to the order information and an unmanned delivery robot that will receive the goods from the assembly point and deliver the same to the delivery location, so that the goods can be delivered to the delivery location within the estimated time of arrival. The control module is configured to transmit a movement command including order information of the goods and position information of the assembly point to the determined unmanned aircraft and the determined unmanned delivery robot.

According to an aspect of the present disclosure, an unmanned cargo aircraft for delivering goods by reflecting navigation route information of a vehicle is provided. The unmanned cargo aircraft for delivering goods by reflecting navigation route information of a vehicle includes: a communications module for receiving a movement command including order information of goods and location information of an assembly point; a navigation module for setting a flight route to the assembly point according to the location information included in the received movement command; and a flight module for controlling flight of the unmanned cargo aircraft to fly along the set flight route. The goods according to the order information are provided to the unmanned delivery robot from the assembly point and are delivered to the delivery location. The delivery location is a delivery location selected by a user from among a plurality of delivery locations located on a navigation route of the vehicle.

According to an aspect of the present disclosure, an unmanned delivery robot for delivering goods by reflecting navigation route information of a vehicle is provided. The unmanned delivery robot, includes: a communications module for receiving a movement command including order information of goods and location information of an assembly point; a navigation module for setting a movement route to the assembly point according to the location information included in the received movement command; and a driving module for controlling the movement of the unmanned delivery robot to move along the set movement route. The unmanned delivery robot is configured to deliver the goods to a delivery location according to the order information received from an unmanned cargo aircraft at the assembly point. The delivery location is a delivery location selected by a user from among a plurality of delivery locations located on the navigation route of the vehicle.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
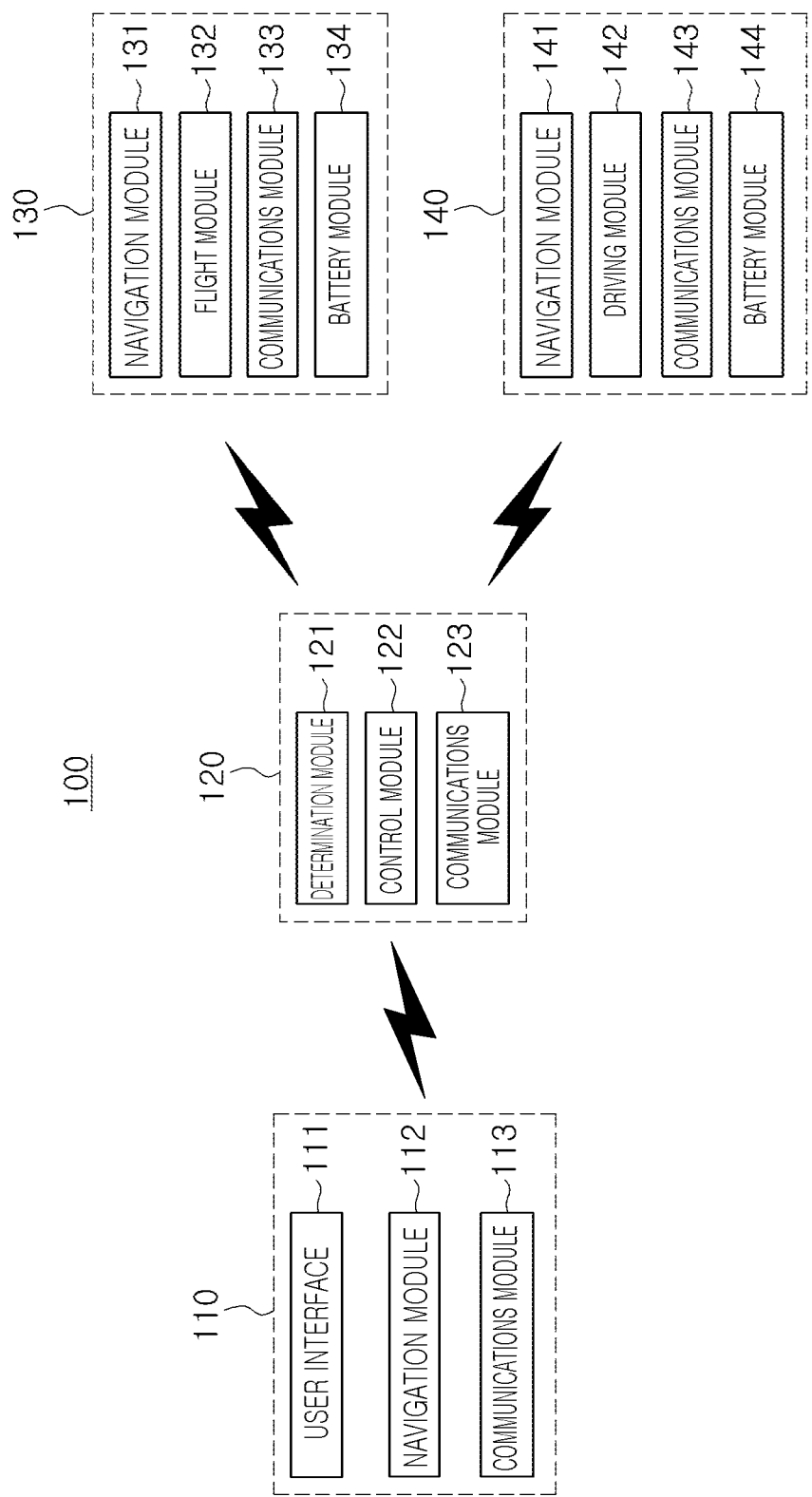
FIG. 1 is a configuration diagram of a delivery management system including a terminal for delivering goods by reflecting a navigation route of a vehicle, a delivery management server, an unmanned delivery robot, and an unmanned cargo aircraft according to an embodiment of the present disclosure.

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the invention to those skilled in the art. In the drawings, the same reference numerals will be used throughout to designate the same or like elements, and the shapes and dimensions of elements may be exaggerated for clarity.

FIG. 1 is a configuration diagram of a delivery management system including a terminal for delivering goods by reflecting a navigation route of a vehicle, a delivery management server, an unmanned delivery robot, and an unmanned cargo aircraft according to an embodiment of the present disclosure.

Figure 2:
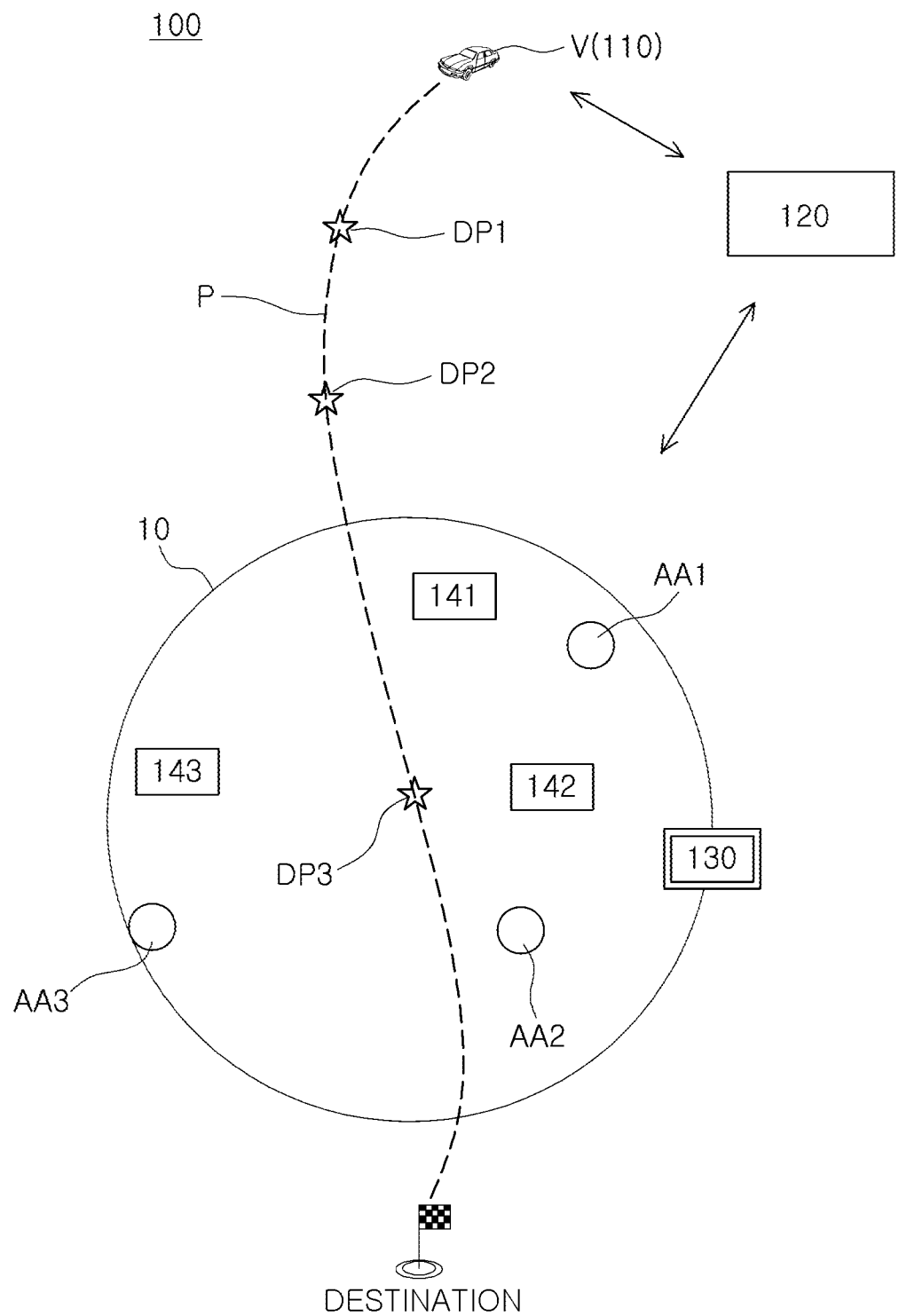
FIG. 2 is a view illustrating an operation for delivering goods by reflecting a navigation route of a vehicle according to an embodiment of the present disclosure.
Figure 3:
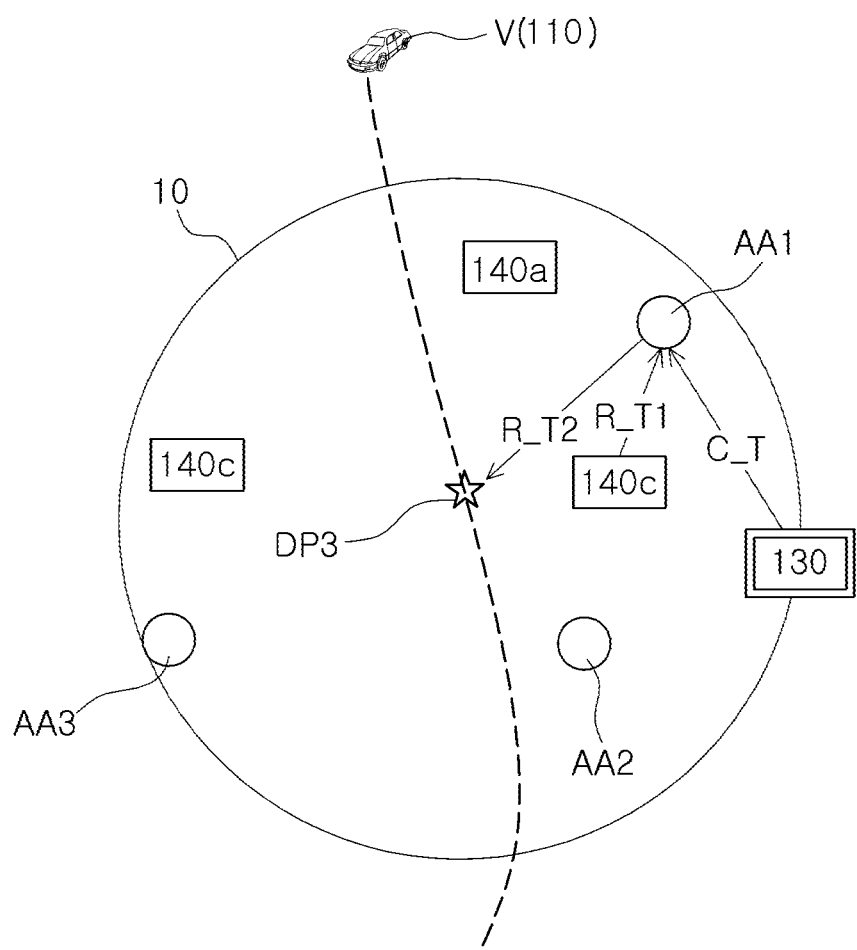
FIG. 3 is a view illustrating a process for determining an unmanned delivery robot to be delivered to an assembly point and a delivery location to receive goods according to an embodiment of the present disclosure.

Meanwhile, FIG. 2 is a view illustrating an operation for delivering goods by reflecting a navigation route of a vehicle according to an embodiment of the present disclosure, and FIG. 3 is a view illustrating a process for determining an unmanned delivery robot to be delivered to an assembly point and a delivery location to receive goods according to an embodiment of the present disclosure.

Hereinafter, operations of the terminal 110, the delivery management server 120, the unmanned cargo aircraft 130, and the unmanned delivery robot 140 for delivering goods by reflecting the navigation route of the vehicle will be described with reference to FIGS. 1 to 3.

As illustrated in FIG. 1, the delivery management system 100 may include a terminal 110, a delivery management server 120, an unmanned cargo aircraft 130, and an unmanned delivery robot 140.

The terminal 110 may include a user interface 111, a navigation module 112, and a communications module 113.

The user interface 111 may receive an order for an item from a user, and may display a navigation route P and a current location of the vehicle V received from the navigation module 112 to be described later.

In the present disclosure, goods may include not only articles such as clothes, umbrellas, books, and the like, ordered by a user, but also various types of documents (e.g., a copy of a passbook, a contract, company documents, or the like) delivered through registered mail.

In addition, the user interface 111 may display a plurality of delivery locations DP1 to DP3 located on the navigation route P transmitted from the delivery management server 120 to be described later, and a delivery location among the displayed plurality of delivery locations DP1 to DP3 selected by a user may be delivered to the navigation module 112.

The user interface 111 may further display a recommended location among the plurality of delivery locations DP1 to DP3.

In the present disclosure, the delivery location is a location designated in advance to receive the ordered goods from the unmanned delivery robot 140, and may be a location such as a rest stop, a gas station, a car center, a drive-through cafe, or the like located on the navigation route P.

In addition, the recommended location is a recommended location based on vehicle information, for example, a vehicle model, number, fuel amount, tire air pressure, status of consumables such as engine oil, and the like. For example, if an amount of fuel is insufficient, the recommended location may be a gas station, and if tire pressure or engine oil is insufficient, the recommended location may be a car center. Alternatively, the recommended location may be a drive-through cafe providing a coffee discount coupon, or the like.

The user interface 111 described above may include, for example, a touch panel.

Meanwhile, the navigation module 112 may generate navigation information including a current location of the vehicle, a destination, and a navigation route P from the current location to the destination based on a GPS location information. The generated navigation information may be transmitted to the delivery management server 120 through the communications module 113.

In addition, the navigation module 112 may transmit order information of goods input through the user interface 111, for example, the type, quantity, customer name, or the like, of the goods to the delivery management server 120 through the communications module 113.

In addition, the navigation module 112 may obtain an estimated time of arrival to the delivery location selected by the user. The obtained estimated time of arrival may be transmitted to the delivery management server 120 through the communications module 113.

In addition, when the vehicle V passes the delivery location, the navigation module 112 may display a delivery location located after a delivery location selected by a user among a plurality of delivery locations on the navigation route and a recommended delivery location through the user interface 112.

The communications module 113 may include a wired or wireless interface for transmitting and receiving various data with the delivery management server 120.

The above-described terminal 110 may be an audio, video, navigation (AVN) device mounted on a vehicle. The above-described AVN device is an abbreviation of Audio, Video, and Navigation, and is an electronic component for a vehicle in which in-vehicle audio, a multimedia device, and a navigation device are integrated and implemented as a single unit.

In addition, the above-described terminal 110 may be a mobile terminal. The above-described portable terminal may include, for example, a smartphone, a mobile phone, a notebook computer, a digital broadcasting terminal, a personal digital assistant (PDA), a portable multimedia player (PMP), a tablet PC, and the like.

Meanwhile, the delivery management server 120 may include a determination module 121, a control module 122, and a communications module 123.

When a delivery location selected by a user and an expected time of arrival of the vehicle to the selected delivery location are received, the determination module 121 may determine an assembly point that will receive the goods according to order information loaded in the unmanned cargo aircraft and an unmanned delivery robot that will receive the goods from the assembly point and deliver the same to the delivery location, so that the goods can be delivered to the delivery location within the expected time of arrival. Information on the determined assembly point and the unmanned delivery robot may be transmitted to the control module 122.

In the present disclosure, the assembly point refers to a location for delivering the goods loaded with the unmanned cargo aircraft 130 to the unmanned delivery robot 140, for example, as illustrated in FIGS. 2 and 3, there may be a plurality of assembly points AA1 to AA3 having a preset radius centered on the delivery location DP3 within a delivery area 10.

In addition, a plurality of unmanned delivery robots 140a to 140c may be within the delivery area 10. Therefore, when there are a plurality of assembly points AA1 to AA3 and a plurality of unmanned delivery robots 140a to 140c in the delivery area 10, it is necessary to determine one assembly point and one unmanned delivery robot for the delivery of goods.

Hereinafter, a process of determining an assembly point and an unmanned delivery robot will be described in detail with reference to FIGS. 2 and 3.

As illustrated in FIGS. 2 and 3, the determination module 121 may determine an assembly point that will receive the goods and an unmanned delivery robot that will deliver the goods to the delivery location DP3 by using a combination of a required time and a battery consumption amount required for each of the unmanned cargo aircraft 130 and a plurality of unmanned delivery robots 140a to 140c to arrive to each of a plurality of assembly points AA1 to AA3, and a required time and a battery consumption amount required for each of the plurality of unmanned delivery robots 140a to 140c to arrive to a delivery location.

Specifically, the determination module 121 may transmit location information of each of the plurality of assembly points AA1 to AA3 to the unmanned cargo aircraft 130, and at the same time, request a first required time required to arrive at each of the plurality of assembly points AA1 to AA3 and a first battery consumption amount.

In addition, the determination module 121 may transmit location information of each of the plurality of assembly points AA1 to AA3 and location information of the delivery location DP3 to each of the plurality of unmanned delivery robots 140a to 140c, and at the same time, request a second required time and a second battery consumption amount required to arrive at each of the plurality of assembly points AA1 to AA3, and a third required time and a third battery consumption amount required to arrive at the delivery location from each of the plurality of assembly points AA1 to AA3.

Specifically, the first required time may be defined as a time taken for the unmanned cargo aircraft to arrive at the assembly point, the second required time may be defined as a time taken for the unmanned delivery robot to arrive at the assembly point, and the third required time may be defined as a time taken for the unmanned delivery robot to arrive at the assembly point.

In addition, the first battery consumption amount may be defined as an amount of power consumed for an unmanned cargo aircraft to arrive at the assembly point, the second battery consumption amount may be defined as an amount of power consumed for the unmanned delivery robot to arrive at the assembly point, and the third battery consumption amount may be defined as an amount of power consumed for the unmanned delivery robot to arrive from the assembly point to the delivery location.

Thereafter, when the first to third required time and the first to third battery consumption amount are received, an assembly point and an unmanned delivery robot may be determined in the following manner.

Specifically, according to an embodiment of the present disclosure, the determination module 121 may perform a process of selecting an unmanned delivery robot whose estimated time of arrival to the delivery location DP3 based on a sum of the first required time (R_T1) and the second required time (R_T2) is earlier than an expected time of arrival of the vehicle V, among unmanned delivery robots of which a second required time (R_T1) is earlier than a first required time (C_T) for the same assembly point, for each of the plurality of assembly points.

Thereafter, the determination module 121 may determine an unmanned delivery robot and an assembly point having the smallest sum of the first battery consumption amount, the second battery consumption amount, and the third battery consumption amount, among the unmanned delivery robots selected for each of the plurality of assembly points, as an unmanned delivery robot to deliver the goods to the delivery location and an assembly point to receive the goods, respectively.

In the case of the above-described embodiment, it is because the delivery time and battery consumption amount are appropriately combined to increase delivery efficiency.

Alternatively, according to an embodiment of the present disclosure, the determination module 121 may determine an assembly point, closest to a delivery location DP3 among a plurality of assembly points AA1 to AA3 as an assembly point to receive the goods.

Thereafter, the determination module 121 may select an unmanned delivery robot whose estimated time of arrival to the delivery location based on a sum of the second required time (R_T2) and the third required time (R_T3) is earlier than an expected time of arrival of the vehicle V, among unmanned delivery robots of which a second required time (R_T2) is earlier than a first required time (C_T) for the determined assembly point, and determine an unmanned delivery robot having the second required time R_T1 closest to the first required time C_T may be determined as an unmanned delivery robot that will deliver the goods to the delivery location DP3.

In the case of the above-described embodiment, it is because an idle time of the unmanned delivery robot and the unmanned cargo aircraft is minimized, and at the same time, only the delivery time is considered for delivery in the shortest time.

Alternatively, according to an embodiment of the present disclosure, the determination module 121 may perform a process of selecting an unmanned delivery robot whose estimated time of arrival to the delivery location based on a sum of the second required time (R_T1) and the third required time (R_T3) is earlier than an expected time of arrival of the vehicle V, among unmanned delivery robots of which a second required time (R_T1) is earlier than a first required time (C_T) for the same assembly point, for each of the plurality of assembly points.

Next, when a sum of the second required time (R_T1) and the third required time (R_T2) among the unmanned delivery robots selected for each of the plurality of assembly points is less than a preset total delivery time (R_T1), the determination module 121 may determine an unmanned delivery robot and an assembly point having the smallest sum of the second required time (R_T1) and the third required time (R_T2) as an assembly point to receive the goods and an unmanned delivery robot to deliver the goods to the delivery location (DP3).

On the other hand, when the sum of the second required time and the third required time is equal to or greater than a preset total delivery time, the determination module 121 may determine an unmanned delivery robot and an assembly point having the smallest sum of the first battery consumption amount, the second battery consumption amount, and the third battery consumption amount, as an unmanned delivery robot to deliver goods to the delivery location DP3 and an assembly point to receive the goods, respectively.

In the case of the above-described embodiment, when the sum of the second required time (R_T1) and the third required time (R_T2) is less than a preset total delivery time, it can be assumed that delivery is a relatively short distance, so that the delivery is performed within a short time without considering battery consumption amount.

On the other hand, when the sum of the second required time R_T1 and the third required time R_T2 is equal to or greater than the preset total delivery time, it can be assumed that the delivery is a relatively long distance, so that the delivery is performed to minimize the battery consumption amount.

The preset total delivery time may be, for example, 30 minutes, but it should be noted that this is only for helping understanding of the invention and is not limited to the above-described specific values.

Referring back to FIG. 1, the control module 122 may search for the delivery locations DP1 to DP3 located on the navigation route P based on the navigation information received from the terminal 110, and transmit the searched plurality of delivery locations DP1 to DP3 to the terminal 110 through the communications module 123.

In addition, the control module 122 may transmit a movement command including order information of goods and location information of an assembly point to the unmanned cargo aircraft and the unmanned delivery robot through the communications module 123.

The communications module 123 may include a wired or wireless interface for transmitting and receiving various data with the terminal 110, the unmanned cargo aircraft 130, and the unmanned delivery robot 140.

Meanwhile, the unmanned cargo aircraft 130 may include a navigation module 131, a flight module 132, a communications module 133, and a battery module 134.

The above-described unmanned cargo aircraft 130 may be a moving object autonomously traveling in the sky according to a preset route using a driving device including a propeller, and the like, and transporting a plurality of articles to an assembly point.

Specifically, when a movement command is received from the delivery management server 120, the navigation module 131 may generate a flight route to the assembly point according to location information included in the movement command.

In addition, the navigation module 131 may calculate a first required time and a first energy consumption amount according to a request of the delivery management server 120, and transmit the same to the delivery management server 120.

Meanwhile, the flight module 132 may control a flight of the unmanned cargo aircraft 130 to fly along a flight path generated by the navigation module 131. To this end, the flight module 132 may include, for example, a propeller and a driving motor.

The communications module 133 may include a wired or wireless interface for transmitting and receiving various data with the delivery management server 120 and the unmanned delivery robot 140.

The battery module 134 is a module for supplying power to the flight module 132 described above, and various types of batteries such as a lithium ion battery, an all-solid-state battery, and the like, may be used.

Meanwhile, the unmanned delivery robot 140 may include a navigation module 141, a driving module 142, a communications module 143, and a battery module 144.

The above-described unmanned delivery robot 140 may be a moving object autonomously traveling on the ground according to a preset route using a driving device including wheels, quadrupeds, or the like, and receiving a portion of a plurality of goods from the unmanned cargo aircraft 130 at the assembly point to the delivery location DP3.

Specifically, when a movement command is received from the delivery management server 120, the navigation module 141 may generate a route to the assembly point according to location information of the assembly point included in the movement command.

In addition, the navigation module 141 may calculate the second to third required times and the second to third battery consumption amounts according to a request of the delivery management server 120, and transmit the same to the delivery management server 120.

The driving module 142 may control the unmanned delivery robot 140 to drive along a path set by the navigation module 141. To this end, the driving module 142 may include, for example, a driving motor for driving the wheels, quadruped, and the like.

The communications module 143 may include a wired or wireless interface for transmitting and receiving various data with the delivery management server 120 and the unmanned cargo aircraft 130.

The battery module 144 is a module for supplying power to the above-described driving module 142, and various types of batteries such as a lithium ion battery, an all-solid-state battery, and the like may be used.

As described above, according to an embodiment of the present disclosure, by delivering goods to a delivery location desired by a user within an estimated time of arrival among a plurality of delivery locations located on a navigation route, a user may receive goods from the desired delivery location without a navigation route to a destination, thereby improving customer satisfaction and purchasing convenience.

In addition, according to an embodiment of the present disclosure, when a plurality of assembly points and a plurality of unmanned delivery robots exist within a delivery area having a preset radius centered on the delivery location, the assembly point and the unmanned delivery robot can be determined by an optimal combination.

Figure 4:
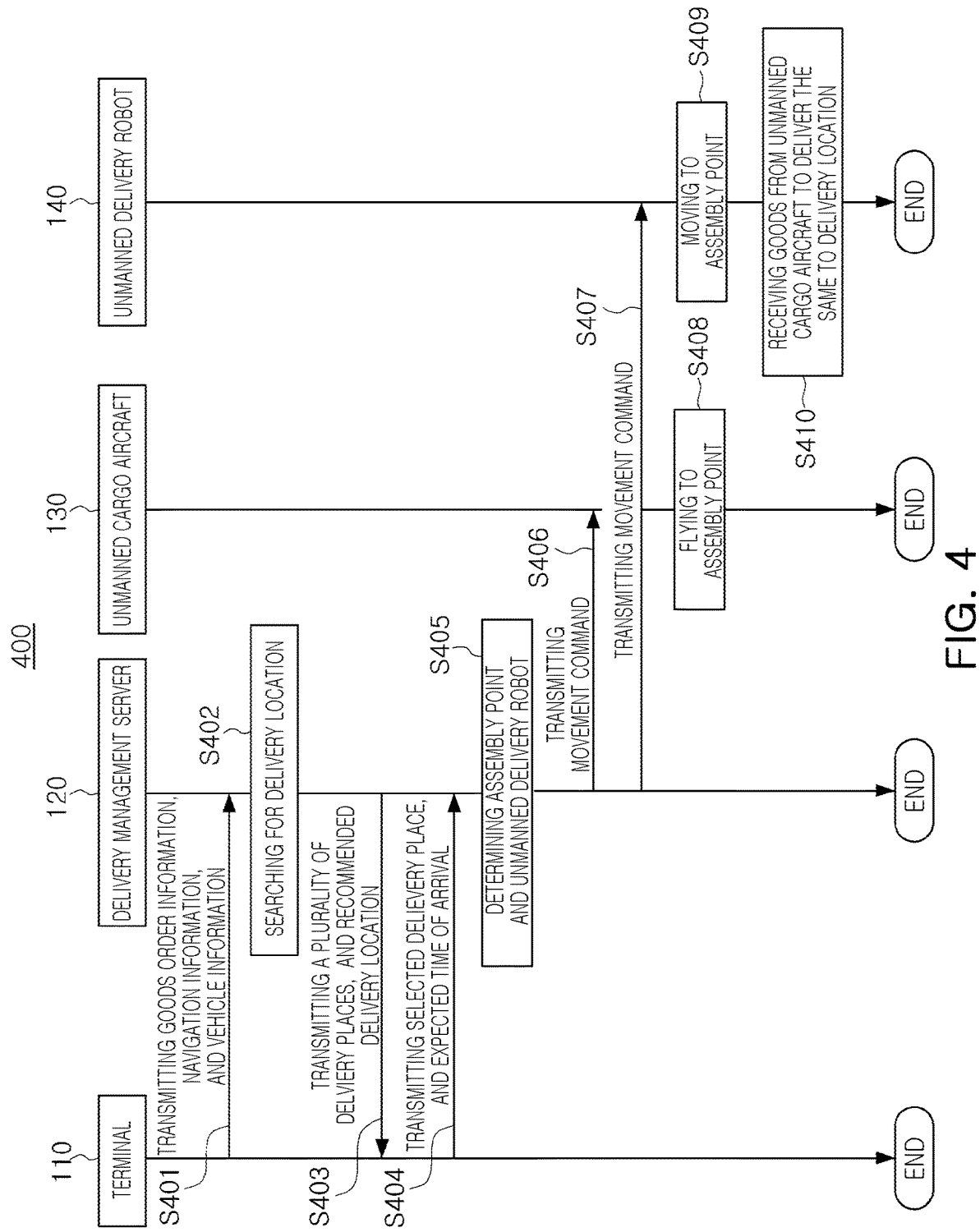
FIG. 4 is a flowchart illustrating a method for delivering goods by reflecting a navigation route of a vehicle according to an embodiment of the present disclosure.
Figure 5:
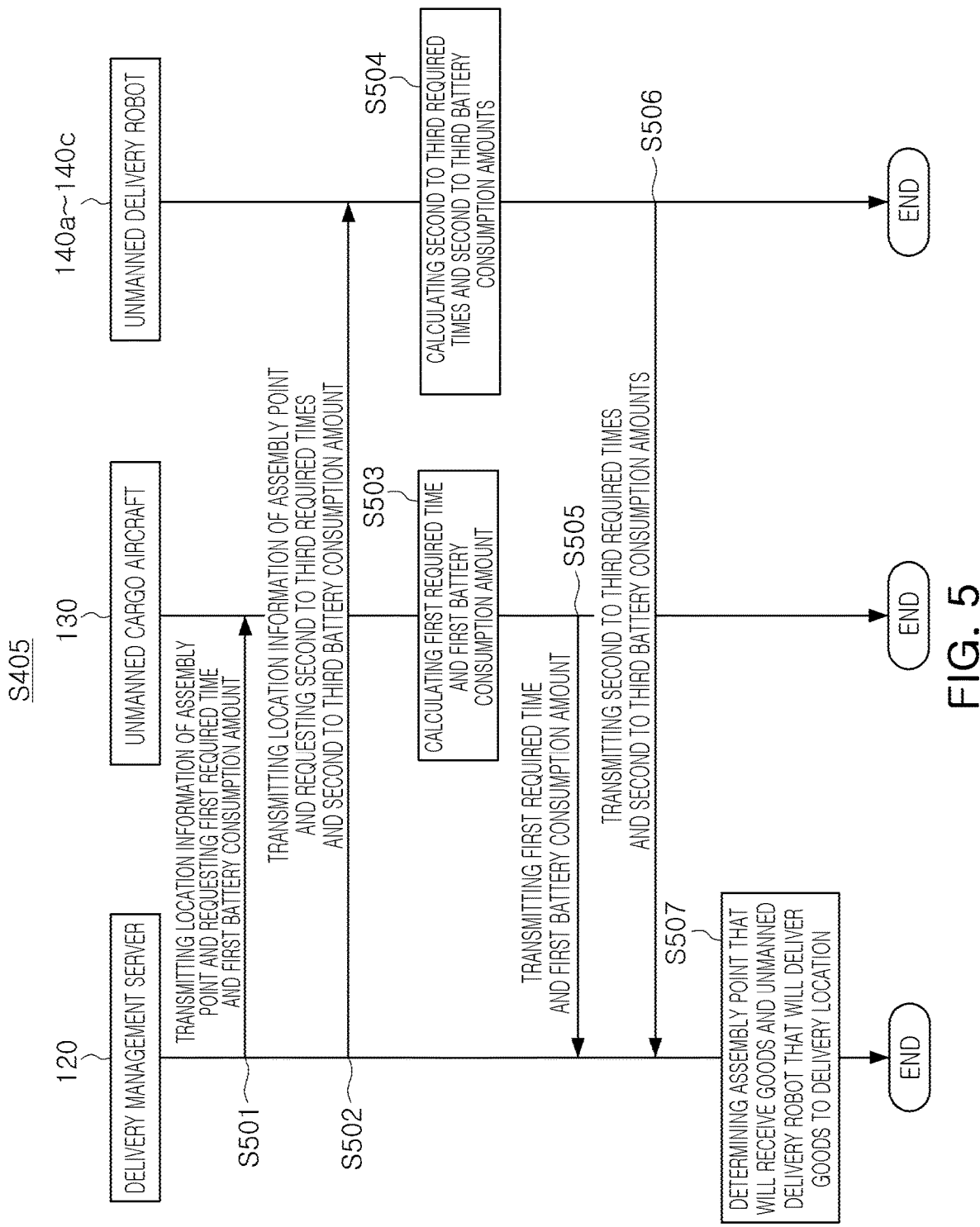
FIG. 5 is a flow chart embodying step S405 of FIG. 4.

FIG. 4 is a flowchart illustrating a method for delivering goods by reflecting a navigation route of a vehicle according to an embodiment of the present disclosure. Meanwhile, FIG. 5 is a flowchart specifically illustrating step S405 of FIG. 4.

Hereinafter, a method (400) for delivering goods by reflecting a navigation route of a vehicle according to an embodiment of the present disclosure will be described with reference to FIGS. 1 to 5. However, for the sake of simplification of the invention, descriptions overlapping those of FIGS. 1 to 3 will be omitted.

First, referring to FIGS. 1 to 5, the method (400) for delivering goods by reflecting the navigation route of a vehicle according to an embodiment of the present disclosure may be initiated by step S401 of transmitting order information of the goods, navigation information, and vehicle information from the terminal 110. The order information of goods includes the type, quantity, customer name, and the like, of the goods, the navigation information includes a current location, a destination, and a navigation route P from the current location to a destination of the vehicle, and the vehicle information may include a vehicle model, number, fuel amount, tire air pressure, consumable status, and the like, such as engine oil, as described above.

Next, the delivery management server 120 may search for a plurality of delivery locations DP1 to DP3 located on the navigation route P based on the navigation information received from the terminal 110, and transmit the searched plurality of delivery locations DP1 to DP3 to the terminal 110 (S402 and S403). As described above, a recommended location can be transmitted among a plurality of delivery locations.

Next, the terminal 110 may transmit a delivery location selected by a user and an estimated time of arrival to the delivery location selected by the user to the delivery management server 120 (S404).

Thereafter, the delivery management server 120 may determine an assembly point and an unmanned delivery robot (S405).

The step S405 described above will be described with reference to FIG. 5.

As illustrated in FIG. 5, the delivery management server 120 may transmit location information of each of a plurality of assembly points (AA1 to AA3) to the unmanned cargo aircraft 130 at the same time and request a first required time and required to arrive at each of the plurality of assembly points AA1 to AA3 and a first battery consumption amount (S501).

In addition, the delivery management server 120 may transmit location information of each of the plurality of assembly points AA1 to AA3 and location information of the delivery location DP3 to each of a plurality of unmanned delivery robots 140a to 140c, and at the same time, request a second requested time and a second battery consumption amount required to arrive at each of the plurality of assembly points AA1 to AA3, and a third required time and a third battery consumption amount required to arrive at the delivery location from each of the plurality of assembly points AA1 to AA3 (S502).

Specifically, as described above, a first required time may be defined as a time taken for an unmanned cargo aircraft to arrive at an assembly point, a second required time may be defined as a time taken for an unmanned delivery robot to arrive at an assembly point, and a third required time may be defined as a time taken for an unmanned delivery robot to arrive at a delivery location from the assembly point.

In addition, as described above, a first battery consumption amount may be defined as an amount of power consumed for an unmanned cargo aircraft to arrive at an assembly point, a second battery consumption amount may be defined as an amount of power consumed for an unmanned delivery robot to arrive an assembly point, and a third battery consumption amount may be defined as an amount of power consumed for an unmanned delivery robot to arrive at a delivery location from the assembly point.

Thereafter, the unmanned cargo aircraft 130 may calculate the first required time and the first battery consumption amount (S503), and then transmit the calculated first required time and the first battery consumption amount to the delivery management server 120 (S505).

Similarly, a plurality of unmanned delivery robots 140a to 140c may calculate second to third required times and second to third battery consumption amounts (S504), and then transmit the calculated second to third required times and the second to third battery consumption amounts to the delivery management server 120 (S506).

Finally, when the first required time to the third required time and the first battery consumption amount and the third battery consumption amount are received, the delivery management server 120 may determine an assembly point to receive goods and an unmanned delivery robot that will deliver the goods to a delivery location (S507).

According to an embodiment of the present disclosure, the determination module 121 may perform a process of selecting an unmanned delivery robot whose expected time of arrival to the delivery location DP3 based on the sum of the second required time R_T1 and the third required time C_T, among unmanned delivery robots in which the second required time R_T1 is earlier than the first required time C_T for the same assembly point, is earlier than an expected time of arrival of the vehicle V to each of the plurality of assembly points.

Thereafter, the determination module 121 may determine an unmanned delivery robot and an assembly point having the smallest sum of the first battery consumption amount, the second battery consumption amount, and the third battery consumption amount among the unmanned delivery robots selected for each of the plurality of assembly points, as an unmanned delivery robot to deliver goods to a delivery location and an assembly point where the goods are to be delivered, respectively.

In the case of the above-described embodiment, it is because the delivery time and battery consumption amount are appropriately combined to increase delivery efficiency.

Alternatively, according to an embodiment of the present disclosure, the determination module 121 may determine an assembly point, closest to the delivery location DP3 among the plurality of assembly points AA1 to AA3 as an assembly point to receive the goods.

Thereafter, the determination module 121 may determine an unmanned delivery robot whose expected time of arrival to the delivery location based on a sum of the second required time (R_T1) and the third required time (R_T2) is earlier than an expected time of arrival of the vehicle V, among the unmanned delivery robots in which the second required time (R_T1) is earlier than the first required time (C_T) for the determined assembly point, and determine an unmanned delivery robot having the second required time R_T1 closest to the first required time C_T as an unmanned delivery robot that will deliver the goods to the delivery location DP3.

In the case of the above-described embodiment, it is because an idle time of the unmanned delivery robot and the unmanned cargo aircraft is minimized, and at the same time, only a delivery time is considered for delivery, so the delivery is performed in the shortest time.

Alternatively, according to an embodiment of the present disclosure, the determination module 121 may perform a process of selecting an unmanned delivery robot whose expected time of arrival to a delivery location based on a sum of the second required time (R_T1) and the third required time (R_T2), among unmanned delivery robots in which the second required time (R_T1) is earlier than the first required time (C_T) for the same assembly point, is earlier than an expected time of arrival of the vehicle V to each of the plurality of assembly points.

Next, when the sum of the second required time (R_T1) and the third required time (R_T2) among the unmanned delivery robots selected for each of the plurality of assembly points is less than a preset total delivery time, the determination module 121 may determine an unmanned delivery robot and an assembly point having the smallest sum of the second required time (R_T1) and the third required time (R_T2) as an unmanned delivery robot that will deliver goods to the delivery location DP3 and an assembly point to receive the goods, respectively.

On the other hand, when the sum of the second required time and the third required time is equal to or greater than a preset total delivery time, the determination module 121 may determine an unmanned delivery robot and an assembly point having the smallest sum of the first battery consumption amount, the second battery consumption amount, and the third battery consumption amount, as an unmanned delivery robot that will goods to the delivery location DP3 and an assembly point to receive the goods, respectively.

In the case of the above-described embodiment, when the sum of the second required time (R_T1) and the third required time (R_T2) is less than a preset total delivery time, it can be assumed that delivery is a relatively short distance, so that delivery is performed within a fast time without considering battery consumption amount.

On the other hand, when the sum of the second required time R_T1 and the third required time R_T2 is equal to or greater than a preset total delivery time, it can be assumed that the delivery is a relatively long distance, so that the delivery is performed so that the battery consumption amount is minimized.

The preset total delivery time may be, for example, 30 minutes, but it should be noted that this is only for helping understanding of the invention and is not limited to the above-described specific values.

Referring back to FIG. 4, the delivery management server 120 may transmit a movement command including order information of goods and location of an assembly point to the unmanned cargo aircraft 130 and the determined unmanned delivery robot 140 (S406 and S407).

Thereafter, the unmanned cargo aircraft 130 may fly to the assembly point according to the movement command (S408), and the unmanned delivery robot 140 may also move to the assembly point according to the movement command (S409).

Thereafter, the unmanned delivery robot may receive the goods from the unmanned cargo aircraft 130 at the assembly point and deliver the same to the delivery location (S410).

As described above, according to an embodiment of the present disclosure, by delivering goods to a delivery location desired by a user within an estimated time of arrival among a plurality of delivery locations located on a navigation route, the user can receive the goods from the desired delivery location without changing the navigation route to a destination, thereby improving customer satisfaction and purchasing convenience.

In addition, according to an embodiment of the present disclosure, when a plurality of assembly points and a plurality of unmanned delivery robots exist within a delivery area having a preset radius centered on the delivery location, an assembly point and an unmanned delivery robot can be determined by an optimal combination.

Figure 6:
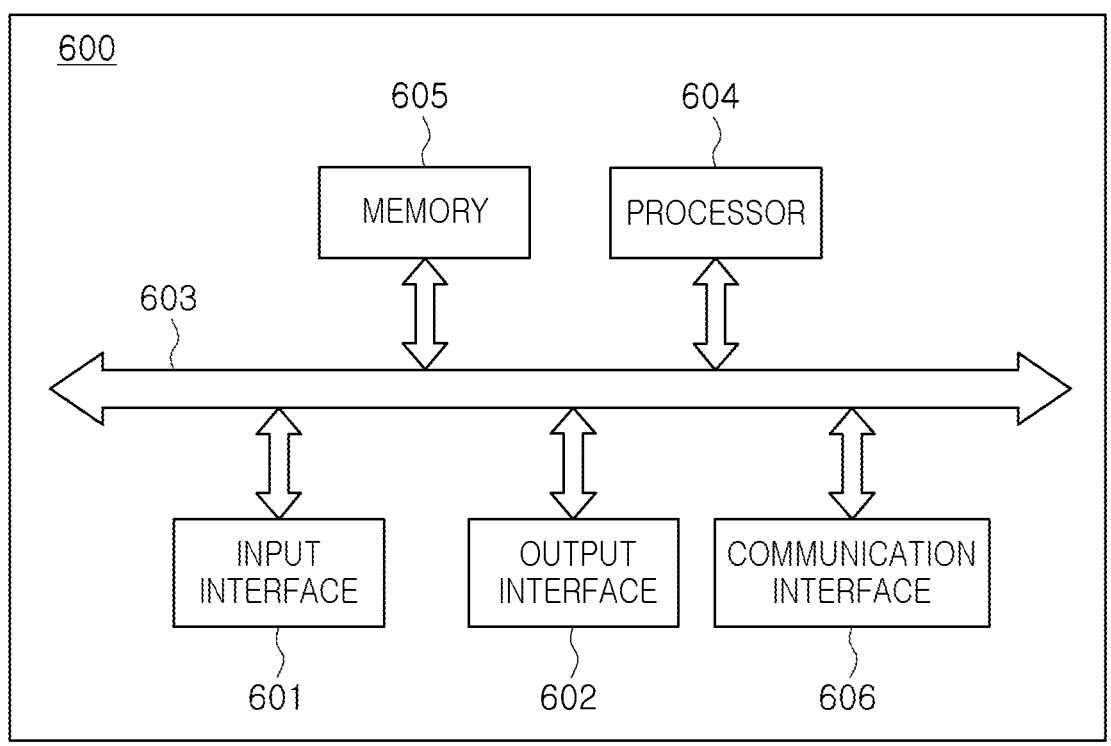
FIG. 6 is a block diagram of a computer device for fully or partially implementing a terminal for delivering goods by reflecting a navigation route of a vehicle, a delivery management server, an unmanned delivery robot, and an unmanned cargo aircraft according to an embodiment of the present disclosure.

Meanwhile, FIG. 6 is a block diagram of a computer device that can fully or partially implement a terminal, a delivery management server, a delivery robot, and an unmanned cargo aircraft for delivering goods by following a navigation route of a vehicle according to an embodiment of the present disclosure, and may be applied to the terminal 110, the delivery management server 120, the unmanned cargo aircraft 130, and the unmanned delivery robot 140 illustrated in FIG. 1.

As illustrated in FIG. 6, the computer device 600 may include an input interface 601, an output interface 602, a processor 604, a memory 605 and a communication interface 606, and the input interface 601, the output interface 602, the processor 604, the memory 605, and the communication interface 606 may be interconnected via a system bus 603.

In an embodiment of the present disclosure, the memory 605 is used to store a program, a command or a code, and the processor 604 executes the program, the command or the code stored in the memory 605, controls the input interface 601 to receive a signal, controls the output interface 602 to transmit a signal. The above-described memory 605 may include read-only memory and random access memory, and may provide instructions and data to the processor 604.

In an embodiment of the present disclosure, it should be understood that the processor 604 may be a central processing unit (CPU), another general-purpose processor, a digital signal processor (DSP), an application specific integrated circuit (ASIC), a field programmable gate array (FPGA), or other programmable logic devices, a discrete gate or a transistor logic device, a discrete hardware component, or the like. The general purpose processor may be a microprocessor, or the processor may be any conventional processor, or the like.

In one implementation process, each method of FIGS. 3 and 4 may be achieved by an integrated logic circuit of hardware or an instruction in a form of software in the processor 604. The content of the method disclosed in relation to the embodiment of the present disclosure may be implemented to be performed and completed by a hardware processor, or may be performed and completed by a combination of hardware and software modules of the processor. The software module may be disposed in a storage medium skilled in the art, such as a random access memory, a flash memory, a read-only memory, a programmable read-only memory or an electrically erasable programmable memory, a register, and the like. The corresponding storage medium is located in the memory 605, and the processor 604 reads information from the memory 605 and implements the contents of the above-described method in combination with hardware. In order to avoid duplication, detailed descriptions thereof are omitted herein.

As set forth above, according to an embodiment of the present disclosure, by delivering goods to a desired delivery location among a plurality of delivery locations located a navigation route within an estimated time of arrival, a user may receive the goods from the desired delivery location without changing the navigation route to a destination, thereby improving customer satisfaction, and purchasing convenience.

In addition, according to an embodiment of the present disclosure, when there are a plurality of assembly points and a plurality of unmanned delivery robots within a delivery area having a preset radius centered on a delivery location, the assembly point and the unmanned delivery robot can be determined by an optimal combination.

While the example embodiments have been illustrated and described above, it will be apparent to those skilled in the art that modifications and variations could be made without departing from the scope of the present invention as defined by the appended claims.

What is claimed is:

1. A delivery management server for delivering goods reflecting navigation route information of a vehicle, the delivery management server comprising: a memory configured to store a program code and at least one processor configured to execute the program code to perform:
when order information of goods and navigation information are received, searching for a plurality of delivery locations located on a navigation route among the navigation information and transmitting the searched delivery locations;
when a delivery location selected by a user among the plurality of delivery locations and an expected time of arrival of the vehicle to the selected delivery location are received, determining a first assembly point that will receive goods loaded in an unmanned cargo aircraft according to the order information and an unmanned delivery robot to receive the goods from the first assembly point and deliver the same to the delivery location, so that the goods can be delivered to the delivery location within the expected time of arrival; and
transmitting a movement command including order information of the goods and location information of the first assembly point to the determined unmanned cargo aircraft and the determined unmanned delivery robot to control the determined unmanned cargo aircraft and the determined unmanned delivery robot to fly,
wherein there are a plurality of assembly points and a plurality of unmanned delivery robots in a delivery area having a preset radius centered on the delivery location, and
the at least one processor is configured to execute the program code to further perform determining the first assembly point that will receive the goods and an unmanned delivery robot that will deliver the goods to the delivery location based on a combination of a required time and a battery consumption amount for each of the plurality of unmanned cargo aircraft and the unmanned delivery robots to arrive at each of the plurality of assembly points and a required time and a battery consumption amount for each of the plurality of unmanned delivery robots to arrive from the first assembly point to the delivery location.

2. The delivery management server of claim 1, wherein the unmanned cargo aircraft and the unmanned delivery robot move to the first assembly point according to the movement command,
wherein the unmanned delivery robot is configured to deliver goods received from the unmanned cargo aircraft at the first assembly point to the delivery location.

3. The delivery management server of claim 1, wherein the at least one processor is configured to execute the program code to further perform:
selecting an unmanned delivery robot whose expected time of arrival to the delivery location based on a sum of the second required time and the third required time is earlier than an expected time of arrival of the vehicle, among unmanned delivery robots of which a second required time is earlier than a first required time for the same assembly point, for each of the plurality of assembly points, and
determining an unmanned delivery robot and an assembly point having the smallest sum of a first battery consumption amount, a second battery consumption amount and a third battery consumption amount, among the unmanned delivery robots selected for each of the plurality of assembly points, as the first assembly point that will receive the goods and the unmanned delivery robot to deliver the goods to the delivery location,
wherein the first required time is a time taken for an unmanned cargo aircraft to arrive at each of the plurality of assembly points, the second required time is a time taken for the unmanned delivery robot to arrive at each of the plurality of assembly points, and third required time is a time taken for the unmanned delivery robot to arrive at a delivery location from each of the plurality of assembly points,
wherein the first battery consumption amount is an amount of power consumed when an unmanned cargo aircraft arrives at each of the plurality of assembly points, the second battery consumption amount is an amount of power consumed when an unmanned delivery robot arrives at each of the plurality of assembly points, and the third battery consumption amount is an amount of power consumed when an unmanned deliver robot arrives at a delivery location from each of the plurality of assembly points.

4. The delivery management server of claim 1, wherein the at least one processor is configured to execute the program code to further perform:
determining an assembly point, closest to the delivery location, among the plurality of assembly points, as the first assembly point that will deliver the goods,
selecting an unmanned delivery robot whose expected time of arrival to the delivery location based on a sum of a second required time and a third required time is earlier than an expected time of arrival of the vehicle, among unmanned delivery robots of which a second required time is earlier than a first required time for the first assembly point, and
determining an unmanned delivery robot of which a second required time is closest to a first required time among the selected unmanned delivery robots, as the unmanned delivery robot that will deliver the goods to the delivery location,
wherein the first required time is a time taken for an unmanned cargo aircraft to arrive at the first assembly point, the second required time is a time taken for the unmanned delivery robot to arrive at the first assembly point, and the third required time is a time taken for the unmanned delivery robot to arrive at the delivery location from the first assembly point.

5. The delivery management server of claim 1, wherein the at least one processor is configured to execute the program code to further perform selecting an unmanned delivery robot whose expected time of arrival to the delivery location based on a sum of a second required time and a third required time, is earlier than an expected time of arrival of the vehicle, among unmanned delivery robots of which the second required time is earlier than the first required time for the same assembly point, for each of the plurality of assembly points,
wherein, when the sum of the second required time and the third required time among the unmanned delivery robots selected for each of the plurality of assembly points, is less than a preset total delivery time, an unmanned delivery robot and an assembly point having the smallest sum of the second required time and the third required time are determined as the first assembly point that will receive the goods and the unmanned delivery robot that will deliver the goods to the delivery location, and when the sum of the second required time and the third required time is equal to or greater than a preset total delivery time, an unmanned delivery robot and an assembly point having the smallest sum of a first battery consumption amount, a second battery consumption amount, and a third battery consumption amount, are determined as the first assembly point that will receive the goods and an unmanned delivery robot that will deliver the goods to the delivery location, wherein the first required time is a time taken for an unmanned cargo aircraft to arrive at each of the plurality of assembly points, the second required time is a time taken for the unmanned delivery robot to arrive at each of the plurality of assembly points, and the third required time is a time taken for the unmanned delivery robot to arrive at a delivery location from each of the plurality of assembly points, wherein the first battery consumption amount is an amount of power consumed when an unmanned cargo aircraft arrives at each of the plurality of assembly points, the second battery consumption amount is an amount of power consumed when an unmanned delivery robot arrives at each of the plurality of assembly points, and the third battery consumption amount is an amount of power consumed when an unmanned delivery robot arrives at a delivery location from each of the plurality of assembly points.

6. The delivery management server of claim 1, wherein the at least one processor is configured to execute the program code to further perform transmitting a recommended delivery location based on vehicle information among a plurality of delivery locations located on a navigation route among the navigation information.

7. The delivery management server of claim 6, wherein the delivery location and the recommended delivery location comprise at least one of a service station, a gas station, a car center, and a drive-through cafe.

8. The delivery management server of claim 1, wherein the unmanned cargo aircraft is a moving object automatically traveling in the sky according to a preset route using a driving device including a propeller, and transporting a plurality of goods to the plurality of assembly point, wherein the unmanned delivery robot is a moving object automatically traveling on the ground according to a preset route using a driving device including wheels or quadrupeds, and receiving a portion of a plurality of goods from the unmanned cargo aircraft at the first assembly point and transporting the same to a delivery location.

9. An unmanned cargo aircraft for delivering goods by reflecting navigation route information of a vehicle, the unmanned cargo aircraft comprising: a memory configured to store a program code and at least one processor configured to execute the program code to perform:

receiving a movement command including order information of goods and location information of a first assembly point;

setting a flight route to the first assembly point according to the location information included in the received movement command; and controlling flight of the unmanned cargo aircraft to fly along the set flight route, wherein the goods according to the order information are provided to the unmanned delivery robot at the first assembly point and delivered to a delivery location, wherein the delivery location is a delivery location selected by a user from among a plurality of delivery locations located on a navigation route of the vehicle, wherein there are a plurality of assembly points and a plurality of unmanned delivery robots within a delivery area having a preset radius centered on the delivery location, and the first assembly point that will receive the goods and an unmanned delivery robot that will deliver the goods to the delivery location are determined based on a combination of an expected time and battery consumption amount for each of the unmanned cargo aircraft and the plurality of unmanned delivery robots and an expected time and battery consumption amount for each of the plurality of unmanned delivery robots to arrive at the delivery location from the first assembly point.

10. The unmanned cargo aircraft of claim 9, wherein a process of selecting an unmanned delivery robot whose expected time of arrival at the delivery location based on a sum of the second required time and the third required time, among unmanned delivery robots in which a second required time is earlier than a first required time for the same assembly point, is earlier than an expected time of arrival, is performed for each of the plurality of assembly points, an unmanned delivery robot and an assembly point having the smallest first battery consumption amount, a second battery consumption amount, and a third battery consumption amount, among the unmanned delivery robots selected for each of the plurality of assembly points, are determined as the first assembly point that will receive the goods and the unmanned delivery robot that will deliver the goods to the delivery location, wherein the first required time is a time taken for an unmanned cargo aircraft to arrive at each of the plurality of assembly points, the second required time is a time taken for the unmanned delivery robot to arrive at each of the plurality of assembly points, and the third required time is a time taken for the unmanned delivery robot to arrive at a delivery location from each of the plurality of assembly points, wherein the first battery consumption amount is an amount of power consumed when an unmanned cargo aircraft arrives at each of the plurality of assembly points, the second battery consumption amount is an amount of power consumed when an unmanned delivery robot arrives at each of the plurality of assembly points, and the third battery consumption amount is an amount of power consumed when an unmanned delivery robot arrives at a delivery location from each of the plurality of assembly points.

11. The unmanned cargo aircraft of claim 9, wherein an assembly point, closest to the delivery location among the plurality of assembly points, is determined as the first assembly point to deliver the goods, an unmanned delivery robot whose expected time of arrival at the delivery location based on a sum of a second required time and a third required time is earlier than an expected time of arrival among the unmanned delivery robots of which a second required time is earlier than a first required time for the first assembly point, is selected, and an unmanned delivery robot of which a second required time is closest to a first required time is determined as the unmanned delivery robot that will deliver the goods to the delivery location, among the selected unmanned delivery robots,
wherein the first required time is a time taken for an unmanned cargo aircraft to arrive at the first assembly point, the second required time is a time taken for the unmanned delivery robot to arrive at the first assembly point, and the third required time is a time taken for the unmanned delivery robot to arrive at the delivery place from the first assembly point.

12. The unmanned cargo aircraft of claim 9, wherein a process of selecting an unmanned delivery robot whose expected time of arrival to the delivery location based on a sum of a second required time and a third required time is faster than an expected time of arrival of the vehicle, among unmanned delivery robots of which a second required time is earlier than a first required time for the same assembly point, is earlier than an expected time of arrival of the vehicle, is performed for each of the plurality of assembly points,
wherein, when the sum of the second required time and the third required time selected for each of the plurality of assembly points is less than a preset total delivery time, an unmanned delivery robot and an assembly point having the smallest sum of the second required time and the third required time are determined as the first assembly point that will receive the goods, and the unmanned delivery robot to deliver the goods to the delivery location,
wherein, when the sum of the second required time and the third required time is equal to or greater than a preset total delivery time, an unmanned delivery robot and an assembly point having the smallest sum of a first battery consumption amount, a second battery consumption amount, and a third battery consumption amount, are determined as the first assembly point that will receive the goods, and an unmanned delivery robot that will deliver the goods to the delivery location,
wherein the first required time is a time taken for an unmanned cargo aircraft to arrive at each of the plurality of assembly points, the second required time is a time for the unmanned delivery robot to arrive at each of the plurality of assembly points, and the third required time is a time taken for the unmanned delivery robot to arrive at a delivery location from each of the plurality of assembly points,
wherein the first battery consumption amount is an amount of power consumed when an unmanned cargo aircraft arrives at each of the plurality of assembly points, the second battery consumption amount is an amount consumed when an unmanned delivery robot arrives at each of the plurality of assembly points, and the third battery consumption amount is an amount of power consumed when an unmanned delivery robot arrives at a delivery location from each of the plurality of assembly points.

13. An unmanned delivery robot for delivering goods by reflecting navigation route information of a vehicle, the unmanned delivery robot comprising: a memory configured to store a program code and at least one processor configured to execute the program code to perform:
receiving a movement command including order information of goods and location information of a first assembly point;
setting a movement route to the first assembly point according to the location information included in the received movement command; and
controlling the movement of the unmanned delivery robot to move along the set movement route,
wherein the unmanned delivery robot is configured to deliver the goods to a delivery location according to the order information received from an unmanned cargo aircraft at the first assembly point,
wherein the delivery location is a delivery location selected by a user from among a plurality of delivery locations located on the navigation route of the vehicle,
wherein there are a plurality of assembly points and a plurality of unmanned delivery robots within a delivery area having a preset radius centered on the delivery location, and
the first assembly point that will receive the goods and an unmanned delivery robot that will deliver the goods to the delivery location are determined based on a combination of a required time and a battery consumption amount for each of the unmanned cargo aircraft and the plurality of unmanned delivery robots and a required time and a battery consumption amount for each of the plurality of unmanned delivery robots to arrive at the delivery location from the first assembly point.

14. The unmanned delivery robot of claim 13, wherein a process of selecting an unmanned delivery robot whose expected time of arrival to the delivery location based on a sum of the second required time and the third required time among unmanned delivery robots in which the second required time is earlier than the first required time for the same assembly point, is faster than an expected time of arrival of the vehicle, is performed for each of the plurality of assembly points,
an unmanned delivery robot and an assembly point having the smallest sum of the first battery consumption amount, the second battery consumption amount, and the third battery consumption amount selected for each of the plurality of assembly points, are determined as the first assembly point that will receive the goods and the unmanned delivery robot that will deliver the same to the delivery location,
wherein the first required time is a time taken for an unmanned cargo aircraft to arrive at each of the plurality of assembly points, the second required time is a time taken for the unmanned delivery robot to arrive at each of the plurality of assembly points, and the third required time is a time taken for the unmanned delivery robot to arrive at a delivery location from each of the plurality of assembly points,
wherein the first battery consumption amount is an amount of power consumed when an unmanned cargo aircraft arrives at each of the plurality of assembly points, the second battery consumption amount is an amount of power consumed when an unmanned delivery robot arrives at each of the plurality of assembly points, and the third battery consumption amount is an amount of power consumed when an unmanned delivery robot arrives at a delivery location from each of the plurality of assembly points.

15. The unmanned delivery robot of claim 13, wherein an assembly point, closest to the delivery location, among the plurality of assembly points is determined as the first assembly point to deliver the goods,
wherein an unmanned delivery robot whose expected time of arrival to the delivery location based on a sum of a second required time and a third required time, among unmanned delivery robots in which a second required time is earlier than a first required time for the first assembly point is faster than an expected time of arrival of the vehicle, is selected, wherein an unmanned delivery robot having the second required time, closest to the first required time, among the selected unmanned delivery robots, is determined as the unmanned delivery robot, wherein the first required time is a time taken for an unmanned cargo aircraft to arrive at the first assembly point, the second required time is a time taken for the unmanned delivery robot to arrive at the first assembly point, and the third required time is a time taken for the unmanned delivery robot to arrive at the delivery location from the first assembly point.

16. The unmanned delivery robot of claim 13, wherein a process of selecting an unmanned delivery robot in which an expected time of arrival to the delivery location is earlier than an expected time of arrival of the vehicle, based on a sum of a second required time and a third required time, among unmanned delivery robots in which a second required time is earlier than a first required time for the same assembly point, is performed for each of the plurality of assembly points, wherein, when the sum of the second required time and the third required time among the unmanned delivery robots selected for each of the plurality of assembly points, is less than a preset total delivery time, an unmanned delivery robot and an assembly point having the smallest sum of the second and third required times, among unmanned delivery robots selected for each of the plurality of assembly points, as the first assembly point that will receive the goods and the unmanned delivery robot to deliver the goods to the delivery location, are determined, wherein the sum of the second required time and the third required time is equal to or greater than a preset total delivery time, an unmanned delivery robot and an assembly point having the smallest sum of the first battery consumption amount, the second battery consumption amount, and the third battery consumption amount, as the assembly point that will receive the goods and the unmanned delivery robot that will deliver the goods to the delivery location, are determined, wherein the first required time is a time taken for an unmanned cargo aircraft to arrive at each of the plurality of assembly points, the second required time is a time taken for the unmanned delivery robot to arrive at each of the plurality of assembly points, and the third required time is a time taken for the unmanned delivery robot to arrive at a delivery location from each of the plurality of assembly points, wherein the first battery consumption amount is an amount of power consumed when the unmanned cargo aircraft arrives at each of the plurality of assembly points, the second battery consumption amount is an amount of power consumed when the unmanned delivery robot arrives at each of the plurality of assembly points, and the third battery consumption amount is an amount of power consumed when the unmanned delivery robot arrives to a delivery location from each of the plurality of assembly points.

* * * * *